United States Patent
Ward

(10) Patent No.: US 11,069,470 B1
(45) Date of Patent: *Jul. 20, 2021

(54) SYSTEM, METHOD AND APPARATUS FOR TRANSFORMER COOLING

(71) Applicant: Marvin W. Ward, Bristow, VA (US)

(72) Inventor: Marvin W. Ward, Bristow, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/113,921

(22) Filed: Dec. 7, 2020

Related U.S. Application Data

(63) Continuation of application No. 15/483,361, filed on Apr. 10, 2017, now Pat. No. 10,861,632, which is a continuation of application No. 13/913,958, filed on Jun. 10, 2013, now Pat. No. 9,620,276, which is a continuation of application No. 12/806,666, filed on Aug. 18, 2010, now Pat. No. 8,461,953.

(60) Provisional application No. 61/272,115, filed on Aug. 18, 2009.

(51) Int. Cl.
| | |
|---|---|
| *H01F 27/02* | (2006.01) |
| *H01F 27/22* | (2006.01) |
| *H01F 27/08* | (2006.01) |
| *H01F 27/12* | (2006.01) |
| *F28F 27/00* | (2006.01) |
| *H01F 27/20* | (2006.01) |
| *H02J 7/00* | (2006.01) |

(52) U.S. Cl.
CPC .............. *H01F 27/22* (2013.01); *F28F 27/00* (2013.01); *H01F 27/025* (2013.01); *H01F 27/08* (2013.01); *H01F 27/12* (2013.01); *H01F 27/20* (2013.01); *H02J 7/00* (2013.01); *F28F 2250/08* (2013.01)

(58) Field of Classification Search
USPC ................................ 320/101; 336/55, 59, 61
See application file for complete search history.

(56) References Cited

U.S. PATENT DOCUMENTS

| | | | | |
|---|---|---|---|---|
| 2,024,742 | A * | 12/1935 | Parsons ................... | H01F 27/06 361/268 |
| 4,205,289 | A * | 5/1980 | Stubblefield ............ | H01F 27/18 336/57 |
| 7,168,251 | B1 * | 1/2007 | Janssen ................... | F03D 80/60 60/641.1 |
| 2008/0314077 | A1 * | 12/2008 | Rim ......................... | F22B 3/02 62/513 |

* cited by examiner

*Primary Examiner* — Shawki S Ismail
*Assistant Examiner* — Kazi S Hossain
(74) *Attorney, Agent, or Firm* — Van Dyke Intellectual Property Law; Raymond Van Dyke

(57) ABSTRACT

An air cooling system, method, apparatus and kit applied to lower transformer operating temperatures, such as governed by a tank or container of oil, allowing transformer components to run more efficiently at a lower temperature level, e.g., down from the hot level operating temperatures typical in stressed conventional devices. By lowering the operational levels to within or below the nominal operational temperature ranges for the equipment, and recovering heat generated during operation, several advantages are obtained.

23 Claims, 9 Drawing Sheets

SYSTEM, METHOD AND APPARATUS FOR TRANSFORMER COOLING

CROSS REFERENCE TO RELATED APPLICATIONS

The present invention claims priority from U.S. patent application Ser. No. 15/483,361, entitled "System, Method and Apparatus for Transformer Cooling," filed Apr. 10, 2017, now U.S. Pat. No. 10,861,632, which claims priority from U.S. patent application Ser. No. 13/913,958, entitled "System, Method and Apparatus for Transformer Cooling," filed Jun. 11, 2013, now U.S. Pat. No. 9,620,276, which claims priority from U.S. patent application Ser. No. 12/806,666, also entitled "System, Method and Apparatus for Transformer Cooling," filed Aug. 18, 2010, now U.S. Pat. No. 8,461,953, and U.S. Provisional Patent Application Ser. No. 61/272,115, entitled "Efficiency Improvements and Cooling Adaptations for AC Power Distribution and Substation Transformers," filed Aug. 18, 2009, the subject matters of which are incorporated by reference herein.

BACKGROUND OF THE INVENTION

Field of Invention

The present invention relates to improvements in power efficiency, particularly due to cooling transformer apparatus in AC power distribution systems, such as employed in small to large power distribution networks.

Description of the Related Art

Industrial power distribution transformers and substation power step-down transformers are major elements for distributing alternating current (AC) electrical power, and constitute a widely-deployed, electrical infrastructure placed at strategic locations inside and surrounding large metropolitan cities, communities and rural areas of every nation worldwide. Within substation distribution sites are large electrical devices known as alternating current (AC) electrical power step-down transformers, devices that have virtually no moving internal parts. Transformers serve a vital role in distributing large sources of electrical energy to cities, suburban, rural communities and industrial complexes, thereby supporting the populations with the ability to use many electrically-powered devices to perform work and other uses in a great many forms. The present invention addresses critical improvements in the operation and maintenance of all such transformer systems.

In general, transformers distribute energy to communities for lighting, cooling, heating of homes, business offices and many other structures, and furnish power to industrial complexes and many other commercial functions typically found in heavy industrial operations and manufacturing facilities. Transformers function to reduce the incoming sourced levels of high megawatts of energy to a medium or lower electrical distributed level output, thereby supplying communities and industry with safer and more useable levels of energy. Accordingly, substation transformers are strategically placed in cities, towns and rural communities, and receive input levels of high voltage sources, e.g., transmitted over long-haul transmission lines from major power generating stations, and distribute this generated electrical power over AC Power grids to supply electrical energy to all types of consumers and end user customers in nearby geographical centers.

For all intent and purposes, transformers have few or no moving parts and can be subjected to extreme environmentally-adverse conditions, such as high heat, especially when internal components, typically bathed in oil, are exposed to high temperature levels. Indeed, the oil-filled tank, which houses the electrical transformer core windings and the magnetically-energized iron core, can be greatly affected by high levels of heat, particularly by becoming much less electrically efficient. By their nature, almost all transformers are exposed to wide temperature variances, and some can generate extreme high internal operating temperature conditions, e.g., that often occur during periods when distribution transformers are allowed to operate near peak power loading or near their overload state. Often times, such elevated high operating temperature conditions are present in distribution transformers when driven by operators desiring to achieve a greater return on investment of their power distribution infrastructure. The distribution of electrical power under peak customer demands, especially in the heat of summer months, can become a tricky business of balancing peak loads, while experiencing high demands for energy. Operating under these conditions can thus produce very high temperature conditions within the transformer apparatus, and oftentimes will result in greatly increased transformer inefficiencies. As is known in the art, transformers operated under elevated heat conditions will result in increased power consumption supplied from the higher power grid (input from generating supplied source) due to experiencing a lower operating efficiency as heat builds up more resistance across the transformer windings, generating even more heat, and, in effect, drive up the value of resistance of the transformer core winding conductors.

The system, method, apparatus and kit of the present invention minimize power losses in power distribution and substation transformers by as much as 5% and up to 35% of the total megawatts consumed. This megawatt power loss, usually in the form of heat, occurs between the high voltage input primary and medium voltage secondary distribution output terminals. Prevention of this heat-related power loss is accomplished by cooling the transformer internally to a lower and sustainable nominal operating temperature, and maintaining the internal transformer windings, iron core and the ambient cooling oil at an environmentally-reduced temperature level, thereby maximizing efficiency and minimizing unnecessary energy loss and component degradation.

Transformer high-operating temperature buildup can occur when outside environmental (high temperature) conditions and transformer peak loading conditions occur, usually simultaneously, causing internal current losses to increase within the transformer, especially within the coil windings and magnetic steel cores inside the transformer that are experiencing extreme high temperature levels due to elevated ambient oil temperatures. Transformer inefficiencies, called "load losses," will occur as long as the transformer is allowed to continue operating above the manufacturer's specific transformer designed efficiency rating. As noted, excessive heat conditions existing inside a transformer drive up an additional input of high voltage/amperes (due to electrical and magnetic inefficiencies) occurring at the high voltage input terminals, causing losses that result from purely current (I) squared times resistance (R) or ($I^2 \times R$) losses occurring within the transformer coil windings. This condition results from elevated resistance in core windings and the remaining losses are through ambient eddy currents (stray electrical potentials) and residual voltages of an inefficient flux field, which cause even higher elevated temperature buildup in the windings, steel core and tank oil of the transformer. Oil is used as a coolant in oil filled tanks, and due to its elevated temperature range, very high and dangerous temperatures are produced in high load conditions.

The cooling methodology of the present invention applies cold, dry, compressed air, via improved cooling technology, to lower a transformer's internal windings and core temperatures to a lower sustainable level that produces a direct reduction in the amount of electrical current used to transfer power across the high voltage to medium voltage windings of distribution and substation AC power and other smaller distribution transformers. Cooling the internal transformer components improves the proficiency of the power distribution transformer windings and substantially reduces power losses that would otherwise occur across hotter power transformer cores and windings. By achieving a lower internal heat buildup and maintaining a lower internal core and winding temperature level, it is possible to reduce power losses that occur within a distribution transformer from about 15% to as high as a 35% reduction in on-load power losses.

As energy conservation becomes more important in society, the need for improving performance is critical, particularly in situations where considerable energy is needlessly lost. Accordingly, the techniques and structures proposed in the present invention are of interest to most of the people of the world, opening the principles of the present invention to additional usages, as discussed in more detail hereinbelow.

Accordingly, there is a need for improvements in energy consumption and conservation, particularly with the use of transformer technologies in diverse situations, residential and commercial, large and small. More specifically, there is a need for systems, methods, apparatuses and kits employing the principles of the present invention to all areas of the earth, from urban to remote areas.

SUMMARY OF THE INVENTION

The present invention is directed to improved air cooling technologies applied to lower transformer operating temperatures, such as within a tank or container of oil, and running transformer components at a lower temperature level, e.g., down from the hot level environment typical in stressed prior art devices to levels within or below the nominal operational temperature ranges for the equipment.

In an alternative embodiment, a local power distribution system may be equipped with a steam-driven turbine only, and the method of supplying primary power source is coupled with solar panels and wind-driven generators of a primary power source that powers the system during daylight and night hours. The solar array is the primary source during daylight period and the steam turbine supplements the battery supply during non-daylight hours.

The present invention relates to methods, systems, apparatuses and kits for creating a more efficient and effective cooling system to improve electrical distribution efficiency by improving, modifying and retro-fitting various elements of it. The improvements of the present invention can be deployed in above ground systems and below ground implementations.

The aforementioned needs are satisfied by several aspects of the present invention, directed to apparatuses, systems, kits and methodologies for retrofitting inefficient, prior art transformer systems. It should be appreciated that the embodiments herein can be implemented in numerous ways, including as a system, kit, device and instructions for the use therefor. Several embodiments of the present invention are described below.

Other embodiments and advantages of the invention are apparent from the following Detailed Description, taken in conjunction with the accompanying Drawings, illustrating, by way of example, the principles of the invention.

BRIEF DESCRIPTION OF THE DRAWINGS

While the specification concludes with claims particularly pointing out and distinctly claiming the subject matter that is regarded as forming the present invention, it is believed that the invention will be better understood from the following description taken in conjunction with the accompanying Drawings, where like reference numerals designate like structural and other elements, in which:

DETAILED DESCRIPTION OF THE PRESENT INVENTION

Figure 1:
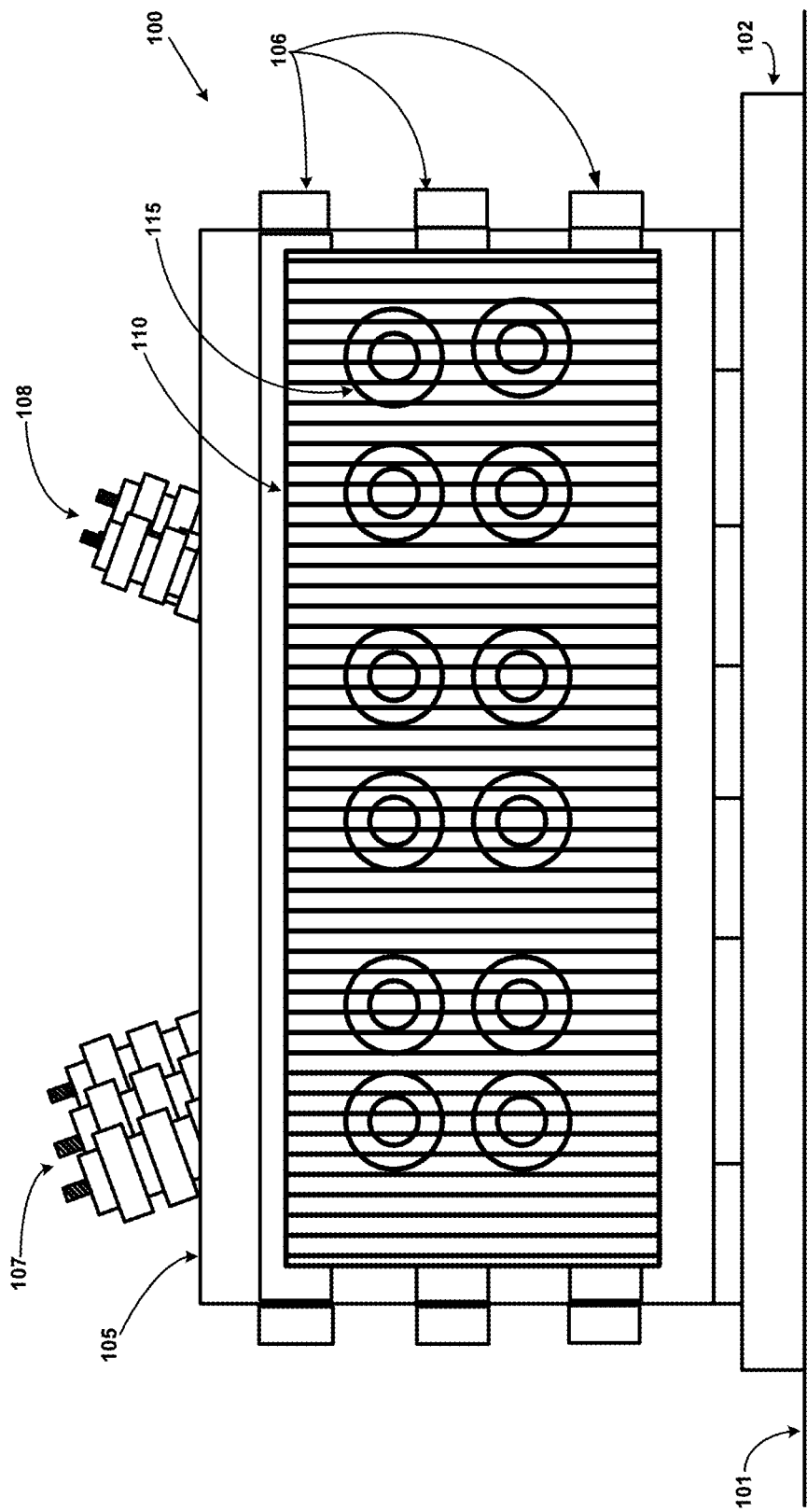
FIG. 1 is a front elevational view of a prior art transformer apparatus.

The present invention will now be described more fully hereinafter with reference to the accompanying Drawings, in which preferred embodiments of the invention are shown. It is, of course, understood that this invention may, however, be embodied in many different forms and should not be construed as limited to the embodiments set forth herein; rather, these embodiments are provided so that the disclosure will be thorough and complete, and will fully convey the scope of the invention to those skilled in the art. It is, therefore, to be understood that other embodiments can be utilized and structural changes can be made without departing from the scope of the present invention.

All over the world, owners and operators within the electrical power distribution industry own and operate AC power distribution transformers that are placed in strategic locations to serve all type of clients, large and small. Electrical power distribution transformers can be found in a wide variety of environments, from outback rural country sides with small loads to large and very large power loads serving metropolitan cities and industrial complexes. All of these locations share a common need: the need for good, dependable electrical energy delivered efficiently and reliably. In some parts of the United States, and across the world, new building expansions have been phenomenal, causing power companies to expand their distribution capability by expanding substations and establishing new substation distribution points. All of this is done to meet the need for increased electrical power, so much so that many substation transformers are operating at near peak loads, i.e., at the borders of their specifications and often at or beyond operational tolerances.

Peak loading by the electrical industry is, however, managed to a certain level very successfully, and often times these peak demands come with a weather change or during certain hours of the day when the population arrives at home or over a weekend. Distribution transformers operate to interface the high voltage and current transmission lines and reduce these high voltages to a level called "medium voltage levels," done mainly for the safety of all. Substation transformers then reduce the high voltage to a medium voltage, and are directly in the line to be subjected to the high peak loads, as well as when lower usage and loads occur. Transformers are, therefore, subjected to the rise and fall of current flow, as user demands can fluctuate widely.

Transformers serve to lower high voltages that are typically fed from the transmission line (connected by means of a transmission power grid), to lower levels known as medium to low voltage power levels. This reduced voltage level is typically used for local distribution to a second layer of transformers that steps the voltage down further and services homes and businesses throughout a neighborhood at the lower household and light industrial electrical potentials.

As noted, transformers that provide these voltage reductions typically have no internal moving parts, and are simple, rugged and durable in construction. They require little maintenance attention, except to generally monitor tank oil conditions, and fill the oil levels found on larger transformers. Transformers typically have a high efficiency and can increase line efficiency through operating with large power inputs fed from high voltage feeder lines. Typical home or business voltages are required to be lower than transmission line voltages for sake of safety hazards and the roll of the AC power distribution and substation transformer.

Power is not transmitted over great distances at a low voltage because of higher power ($I^2$ R) losses that occur in the transmission line or because of heavy investments in transmission wire and pole facilities. Power is usually generated at 14,000 volts and for moderate distances it is generally transmitted at this value. At the load, transformers are used to step down the voltage to 440, 220 and 110 VAC for motors and lights.

If AC power is to be transmitted over a long distance, however, the voltage is usually stepped up to much higher voltages at the generator station and then stepped down at the load. When a large amount of voltage is transmitted over several miles, the voltage is raised by approximately 1,000 volts per mile. Voltages commonly used are 2200, 4400, 6600, 13,200, 22,000, 66,000 and 220,000, as is understood in the art.

Transformer types can range from simple constructions of two coils placed on an iron core to three-phase systems. Basic transformer operation is as follows: when current is applied to one coil, called the primary coil, a magnetic field is produced that interacts with the nearby coil, inducing a current in the secondary coil. The primary magnetic field expands and contracts due to AC current fluctuations, and this action causes lines of magnetic force to be injected through the second coil winding. Since the same amount of magnetic lines of force is induced in the primary winding as is injected in the secondary windings, the voltage induced in the secondary windings has approximately the same potential. Assuming that the resistance of each coil, primary and secondary, are the same, the voltage transfer would be about 1:1 or equal across the transformer windings.

Transformers having a high voltage applied on the primary and desired lower voltages on the secondary must have a reduction ratio associated with the secondary coil windings. This combination is called a step-down transformer, and outputs lower voltages than being applied at the input.

It should be understood that the present invention covers all types of AC and direct current (DC) power transformers. As a detailed theory of operation of the transformer is important to understanding the mechanisms of the present invention, some operational details are discussed herein, particularly as related to forces affected by conditions of high temperature operation.

Elements Affecting Transformer Operation:
Magnetism:

In considering changes to the environmental conditions for transformer operations, a general understanding of magnetism is important. Magnetism is involved in the operation of practically all kinds of electrical devices and apparatuses, such as generators, motors, transformers, controllers, relays and lifting magnets.

Magnetism has invisible lines of force that are called magnetic lines. The space through which these lines of force pass is called the magnetic field. A simple bar magnet demonstrates these invisible lines of magnetic force that flow from one end of the magnetized bar to the opposite, said to be polarized as plus and minus or north and south ends. These two ends are called poles. Essentially, the magnetic lines flow from North Pole end through air space to the South Pole end, and back through the magnet bar material to the North Pole end. This creates a plurality of continuous lines of force about and around the magnetic bar.

Properties of Magnetic Lines of Force:

Magnetic lines of force have certain properties that must be clearly understood in order to understand principles of how a transformer operates at elevated temperatures. For example, there is no insulator for magnetic lines, they pass through all materials. Magnetic lines pass easily through materials that can be magnetized. Also, two magnetic lines that extend in the same direction tend to push each other apart. Further, magnetic lines never cross. Additionally, each magnetic line always forms a closed loop. Since magnetism passes more readily through iron or steel than through air, these materials are attracted by a magnetic line force. The iron core found in transformers is thereby induced with magnetic sources.

Electron Theory of Magnetism:

In each atom, electrons rotate in orbits about the nucleus. Each electron, being a charged particle, rotates in an orbit and thereby produces a magnetic field. Each atom thus becomes a tiny magnet having a north and south pole. If a metal bar (iron) is placed inside a DC voltage coil and electron flow (voltage) is present, the iron bar will thus become magnetized, and the atoms therein will align in the south to north position. When the DC coil is then removed, the metal bar will retain the magnetism for a period of time, generally based upon the impurities contained in the iron. Hard iron will retain the magnetism longer, keeping the atoms aligned longer, than soft iron. Inducing a magnetized bar inside a coil carrying Alternating Current (AC) voltage tends to demagnetize a permanent magnet.

Magnetic Screens:

There is no known substance that will insulate against magnetic flux.

Magnetic Theory:

The law of magnetic circuits is similar to the laws of electric circuits. For example, when a current is sent through a coil having an air core, a magnetic flux (magnetic force) is set up in a clockwise direction, and the amount of flux is expressed in magnetic lines just as the amount of current is expressed in amperes. This flux is set up by a magnetomotive force (mmf) just the same as current, and is proportional to only two factors: the current flowing through the coil and the number of turns in the coil. Thus, mmf is expressed in a unit called the ampere—turn. All magnetic lines of force resist the flow of magnetic lines, and this resistance R is measured in a unit called rel or reluctance.

Magnetic Flux Density:

The number of magnetic lines per square inch is called the "flux density," and is denoted by the letter B. Flux density is determined by dividing the total flux B by the cross-sectional area of the magnetic circuit known as A. In transformer theory, it is usually necessary to compute the number of ampere-turns required to produce the desired amount of flux flowing across the primary to secondary windings.

Magnetic Cores:

The amount of magnetism produced by a coil can be greatly increased, without changing the amount of current, by adding an iron or steel core through the center of the coiled wire conductor. Best performance is achievable using pure iron cores.

Hysteresis:

When a coil of wire (transformer) on an iron core is energized, a flux is set up, which will increase with the flow of current, such as AC voltage and current. When the current in the coil is decreased, the flux density will not decrease along the same line with the current but will decrease much less rapidly. The magnetizing force is removed and is zero, and the flux density is many lines per square inch. Thus, this magnetizing lines of force remaining under this condition is called residual magnetism. Flux lags behind the magnetizing force, and this lagging effect is called hysteresis. In transformers and other electrical machines, this changing and residual flux results in energy dissipated within the transformer, causing heat. Therefore, a material having a high flux density should be selected for cores of transformers. The materials having a much narrow hysteresis curve are more suitable because their flux can be more easily varied and offer the least hysteresis loss, which in effect is lost energy and constitutes an internal heat source.

In every change of cycle of the AC sign wave, the direction of the current or the magnetic flux is reversed, and the residual flux of a positive wave remains even after the current source has reversed polarity to the negative direction and polarity. This remaining flux, represented by the hysteresis response curve, is called a residual current. In transformers, this is an undesirable energy source or residual current, which represents pure energy loss, resulting in the generation of heat and contributing to the internal heat rise within the transformer tank.

Defining Losses in Transformers:

Medium-sized commercial grade AC power transformers are typically deployed and operated by Power Distribution Companies to lower or step down the higher transport level AC kilovolt potentials received from the high voltage electrical grid system. These high-voltage grid potentials are injected into the transformer's primary input voltage winding, where a reduction or step down of voltage level takes place to a lower voltage secondary output current level through a series of windings. The "medium transformer" design includes primary and secondary transformer step-down windings, and forms the basis of stages found in electrical voltage transformers populated about the community based upon total load presented. These medium transformers are attached to the high-voltage feeder grids, and are important to providing reliable power distributions to the neighboring communities. These distribution systems are generally called Sub-Stations, and each represents a large investment for the power company. Distribution power companies typically purchase kilovolts/amps of power from the generating power supplier, measured across the primary winding of the high to medium step-down power transformer. Any inefficiencies or unnecessary power consumption taken from this transport supplier of power represents added costs of doing business for the distribution power company operator. It is, therefore, a purpose of the present invention to lower or reduce no-load and on load loss consumption of power that does not represent work performed.

The distribution or flow of AC power across power transformers remains in the form of AC current and voltage coupled from the high-voltage winding side of the transformer to the lower-voltage winding by way of magnetic flux lines of force or energy. All transformers are composed of a laminated iron core and a series of electrical conductor windings wound about the core. Transformers operate on magnetic flux line transfer principally, and are dependent upon magnetic lines of force derived from the primary source of AC-induced power. These magnetic lines of force, however, generate internal heat within the transformer windings, as well as the core, housed within a sealed oil-filled tank, all of which in conjunction constitute the power distribution transformer.

Heat generation results from the flow of current across the step-down transformers, although excessive heat can be due to the use of poor iron core quality, type winding materials, and the size of the current load placed upon the transformer, as well as the physical condition of the core itself. Basically, power losses in a transformer operating at nominal-rated temperatures are made up of winding material losses, and iron losses amounting to a small amount, estimated to be about one percent (1%) to fifteen percent (15%). The winding loss consists of $I^2$ R losses of both the primary and secondary windings. It should, of course, be understood that higher conductive materials can be used to lower the overall winding resistance.

Physical construction of the iron core and the insulation between laminates can also affect the iron core efficiency when passing electromagnetic lines of force therethrough. Unwanted AC currents called eddy currents occur when the core laminates are not constructed tightly or have undergone expansion due to being exposed to undesirable overheating of the internal elements of the transformer. Further losses are due to iron losses which affect the hysteresis characteristics in transformers. As discussed, AC power varies in direction each 180° degrees of the AC power curve, and this requires AC power to reverse the magnetic field, which therefore consumes additional power, further contributing to loss if not done efficiently. During the flow of electrical power across the windings of the transformer, alternating current (electrometric flux waves) is induced into the transformer core as well as its windings. As temperature rises inside the internal transformer, however, elements, such as the iron core and internal core conductors, have increased resistance, resulting in a buildup of higher eddy currents occurring in the core and the primary and secondary windings. With these higher ambient temperatures, the pure resistance (R) of windings also increase, thereby requiring additional power sources applied across the high-voltage primary to push voltage/current across the output to low-voltage transformers and the final customer load. These additionally-required power potentials are called "power loss" across the transformers.

Power losses across transformer primary and secondary windings are, however, lower in transformers operating at nominal temperatures and, as noted, can rise upwards along with a rise in temperature scale by approximately forty percent (40%), e.g., when internal temperatures are allowed to rise upwards to near 78° C. Operating the transformer components at this higher heat level costs the power distribution operator additional power, which is fed directly from the high-power transport grid, and results in degraded conditions occurring to the internal elements of the transformer, as noted hereinabove and hereinbelow.

In addition to improving transformer operating efficiency, lowering the internal temperature of transformers prolongs the life of the transformer, and extends the life of internal sources of oil used for internal cooling and insulation of the electrical winding elements. Oil operated at elevated temperatures also becomes degraded, reducing its ability to cool efficiently. Internal temperature control also reduces the no-load loss and load loss rating of the transformer, and prolongs the life of the entire unit. Losses can be present 24×7×365 days per year, and the present invention provides the opportunity to establish and maintain a green environment for distribution of electrical energy.

The present invention is directed to improvements in the electrical AC power distribution transformer methodology and applies to all aspects of AC power distribution. The principles of the present invention are applicable to AC power used to perform mechanical and electrical work furnished to users over local AC power transmission arrays ranging from small to large distribution networks capable of delivering Megawatts of AC electrical energy such as produced by electrical power generating plants. As discussed, power generating companies send very high amounts of electrical energy ranging in megawatts of AC electrical power across transmission cable grids to input terminals of high and medium substation step-down transformers that, in turn, distribute medium and lower AC distribution power to other transformers deployed to further step-down these sources of high megawatts of electrical energy to safer and lower AC power levels for delivery to consumers for their use in businesses and homes.

Distribution transformers, deployed to step down high electrical power in the form of AC electricity to lower electrical AC power potentials, were the principal basis for supplying electrical energy during the Industrial Revolution, and transformers remain the principal technique for lowering high megawatts of power to lower mega wattages for safer distribution of electricity throughout large and small cities and rural communities, and for thousands upon thousands of heavy industrial users of electricity, thereby performing a wide variety of work. Transformers function to transform these higher voltage potentials to lower and safer AC power levels, as has been done for the last 50 to 75 years, safely. However, manufacturers of power transformers have been slow to make any great improvements technologically and economically, and considerable older equipment remains out there that has been supplanted by improved, more efficient and newer construction materials.

Indeed, power transformer technologies over the last few years offer little or no significant improvements towards maintaining these transformers under even moderate operational environmental conditions, such as done by lowering the operating temperature of the transformer oil-filled tank containing the electrical steel core and current carrying conductor winding components. During the past 5 years, however, a number of advances have taken place in various cooling device technologies, particularly in the generation and use of compressed air to produce both heat and cooling sources formed from very reliable constructions of stainless steel materials with virtually no moving parts. The present invention combines these air-supplied cooling technologies with existing transformer heat exchange radiator technology to produce a new and improved system and methodology, particularly employing the air cooling technology and new cooling methodology in an enclosed cooling chamber. The improved combination facilitates the cooling of the external oil-filled tank and the air-filled radiators, enabling the substation and distribution-type transformer iron core and electrical coil windings thereabout to operate in a much lower internal temperature state, resulting in savings through lower power consumption inherently, by less internal heat generation loss and consumption, and providing a much improved, higher reliability and higher power transformer distribution capability systems.

Figure 2:
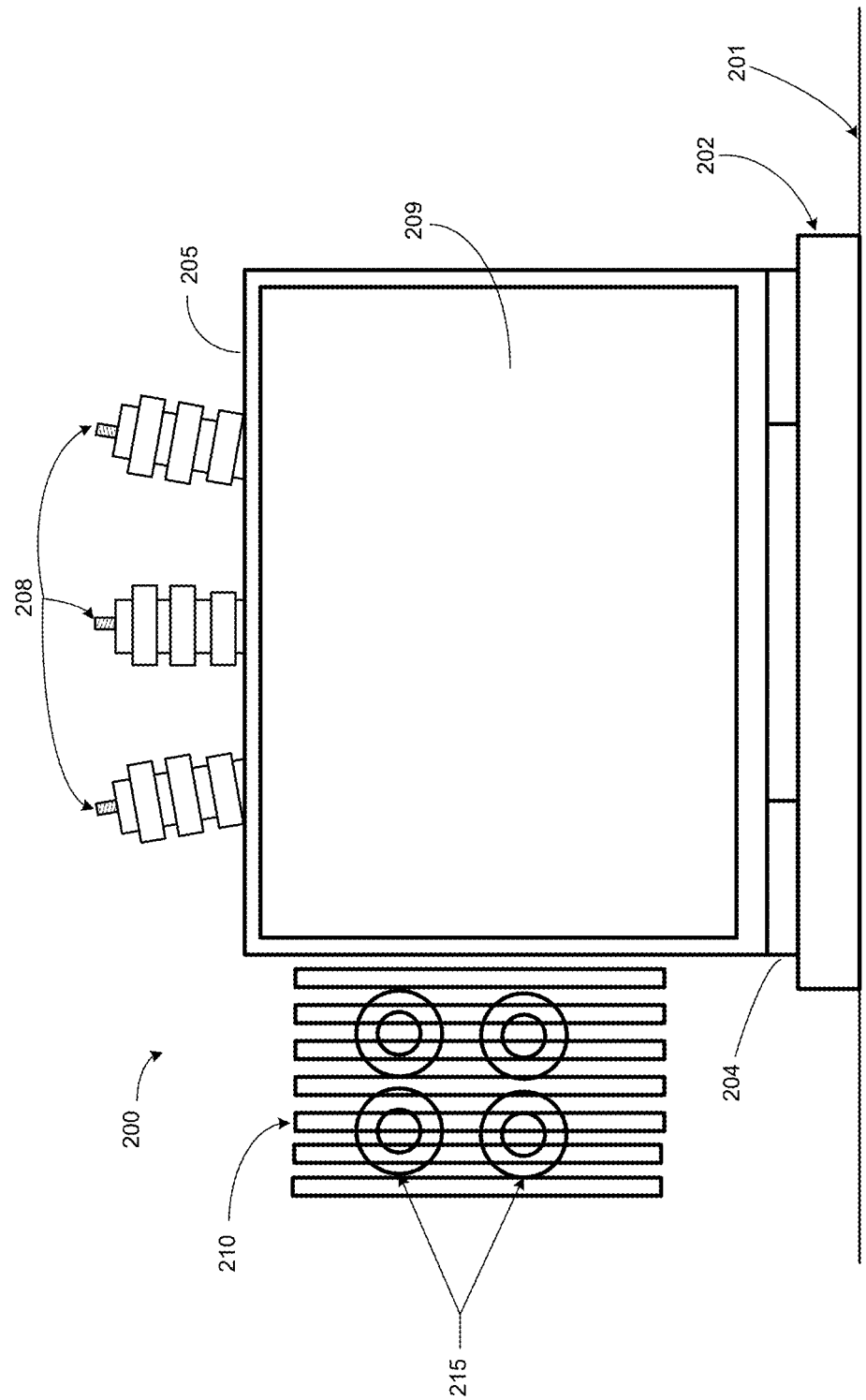
FIG. 2 is a side elevational view of the prior art transformer apparatus illustrated in FIG. 1.
Figure 3:
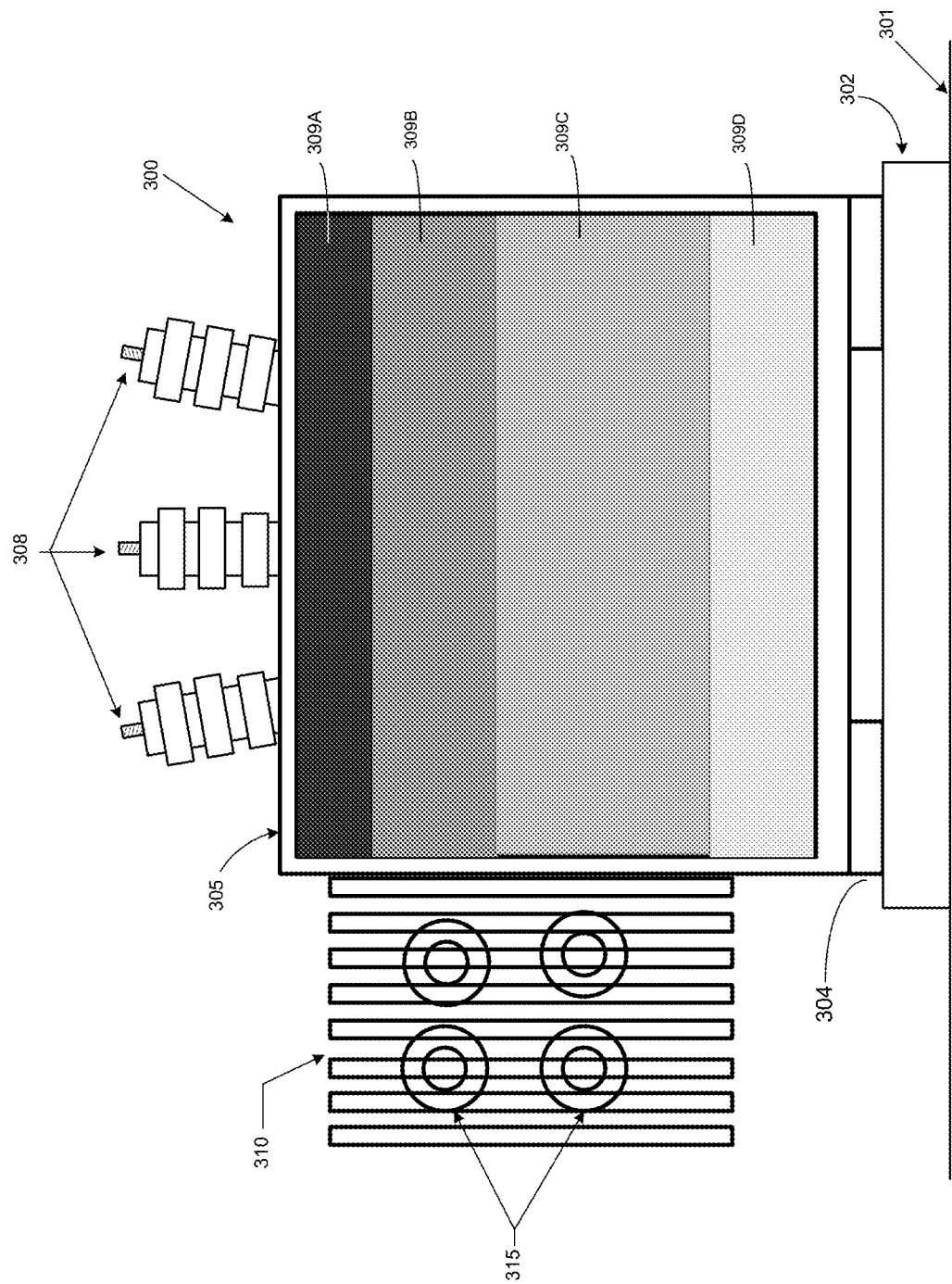
FIG. 3 is a side elevational view, as shown in FIG. 2, illustrating the gradations of heated fluid within the prior art transformer apparatus.

The power distribution transformer cooling technology of the present invention is both more environmentally benign and generates improved energy efficiency delivery of electrical megawatt flow over that of prior art practices, which employ external ambient air flows across externally-mounted radiator grids aided with several attached electrical fans blowing outside ambient air flowing in attempts for cooling an internal oil-filled transformer tank and electrical transformer distribution components therein, as illustrated in connection with FIGS. 1-3 discussed hereinabove.

The present invention represents improvements in power transformer cooling technology, which it should be understood can be employed alone or in conjunction with other power distribution technologies and AC/DC-powered electrical motors, in ways that reduce both the direct costs and disadvantages of presently-available cooling alternatives and consequent cooling attempts taken with past technology.

The present invention is directed to techniques that cool the internal transformer oil-filled liquid used to redirect heat away from the heat generating components within the iron core and electrical coil winding by way of encasing the external radiator heat exchanger. In this manner the configuration of the present invention establishes and maintains a desirable lower operating temperature range that removes heat from the transformer apparatus more efficiently, and more effectively and swiftly removes heat away from the internal vital components, namely, the iron core and AC-power windings. For example, the energy is transferred across one three-phase winding called the primary to another three-phase winding called the secondary, and a lower operational temperature level of the interior components is maintained, whereby the transformer components and oil-filled tank reach a desirable, lower temperature range inside the workings of the step-down substation and power distribution transformers.

Some prior art models of AC power distribution and substation transformers are equipped with oil pumps that move the cooling oil from inside the transformer tank to the outside and then through the cooling bank of radiators.

Internal oil within the transformer flows from the top of the transformer tank, where the internal temperatures are hottest, to the outside through the radiator bank down to the oil pump and back into the bottom of the transformer, as illustrated in connection with FIG. 3. As outside ambient air flows across the banked radiators, heat is removed, depending upon the outside ambient air temperature. Most large substation transformers do not use oil pumps to circulate oil outside through the banked radiators. Instead, they depend upon the heat differential of the tank top oil, as opposed to the bottom where oil will be cooler, and convection causes the oil to flow from tank top out through the air-cooled radiator banks, and back into the tank at the bottom. Some transformer manufacturers use water that is piped into the transformer held in a closed system, never to mix with the oil, and water is circulated to force cooling of the high internal temperature.

Transformers are typically designed to operate at 167% of their rated load and when fully loaded to capacity, transformers radiate much heat, which is accompanied by loss, i.e., the heat is being dumped into the atmosphere, which contributes to environmental warming. Using an energy efficient cooling system for transformers has the benefit of reducing energy consumption, and allows the electricity distribution companies to reduce the amount of electricity taken from networking electrical grids, and provide a means of increasing efficiency with loading by using less electricity from the grids. It also provides reduced costs when operating a transformer with lower loading or no loading at all. The present cooling system invention could be applied to the capital costs of purchasing the transformer, and is further intended to provide a means of improving the efficiency of substation and power distribution transformers used throughout the world. The present cooling system invention can be fit to most every make and model of transformer equipment with cooling radiators regardless if filled with oil or air sources internally.

Transformers are generally engineered to operate at about 55° C. degrees above the outside ambient air temperature and not consume too much energy for operating the fans and pump to cool the transformer. Since the efficiency of the oil- or air-filled transformer can affect the amount of megawatts of power consumed for conventional cooling, there are ratings for no-load and ratings for loaded transformers, whereby the power losses that occur at half the rated transformer load ratings are published and referenced, and these ratings do not account for the added heat generated at or near full loading.

Various features of the present invention are now described. In particular, the present invention provides improvements in AC power distribution transformer methodologies for the creation of dry cool air and the expansion of air (cold air). The present invention also makes improvements in the reduction of power losses of as represented by the current squared times resistance ($I^2 \times R$) of the AC circuits of the electrical energy flow passing through lower electrical elements of the transformer to improving the state of mechanical energy components and efficiency of electrical energy circuit resistance.

The present invention also makes strides in the reuse of the cooling air and the cold energy generated therefrom (as a matter of cogeneration or parallel solar generation), as well as in the design of the environmental mechanisms controlling the air flow into cooling mechanisms.

Furthermore, the present invention provides improvements in the system of control and use of the compressed sources of pneumatic air supply for cooling and air flow to cool the internal oil liquid flow through the external cooling radiator grids and electrical coil wiring of transformer, thereby reducing temperatures of the steel core, which passes the electrical magnetic flux field in the form of induced voltage and magnetic flux field that flows through the inside and around the outside of the transformer steel cores housed inside the transformer oil filled transformer container tank.

In preferred embodiments of the present invention, a transformer air cooling system includes one or more of the following adaptations (or a combination thereof):

Pneumatic, air-driven dry air compressors and filters that produce and condition air to a dry and cold state primary source, and a cold tube or vortex device as its primary or secondary cooling supply sources;

cooling channels for establishing an air cooling matrix of distributed air flow, providing a uniform 360° airstream as its primary air movement method, increasing efficiency in air stirring effect of fresh cool air around transformer heat exchange cooling radiator grids within the enclosed cooling chambers of the present invention;

heat and cooling sensors and processors to determine when automatic air flow controlled cooling is cycled on and off, and otherwise regulate the temperature of the transformer internal elements and/or internal fluids—such regulation can be automatic or manual;

electrical measure of air flow, temperature, and pneumatic air sensors and processors to determine quantity and temperature of cooling air to inject or recycle into the cooling chamber;

air flow sensors that govern the time and method to regulate the circulation of the compressed air and/or operate air amplifiers to increase volume of air flows—such regulation can be pure automatic, semi-automatic or manually regulated;

a recovery system for salvaging and premixing heated air with cool air to manage the re-use of "spent" heated air sources ducted into an air turbine driven duct that spins a DC generator producing DC power amperes for charging banks of DC storage battery power, and said stored power is used to produce electricity used to drive air compressors that are the heart of the cooling system;

generates electricity as a by-product of mechanical air cooling air energy to furnish power and replenish the electrical DC potential that is used to offset the cost of changing the efficiency of transformers by reuse of generated electricity that is recovered due to energy;

a supplied air turbine conversion to generate the electricity to charge electrical potential for storage batteries that power the air compressor operation and/or sustain operation by battery power through the use of wind generation, and small diesel powered generator and steam driven engine generator combination;

a supply of electricity to initiate compressed air for cooling/operation and/or sustain operations aided by electrical power developed by photovoltaic cells;

a supply of electricity to air compressor electrical motors to initiate compressed air/operation and/or supplement operation by photovoltaic cell powering source and from electrical energy supplied by charged battery supply;

an air amplifier closed cycle of compressed air to increase air flow (or of chilled temperature air or expanded heated air to ambient temperature air);

a modular matrix design that permits multiple vortex and air amplifier production units to operate in tandem or parallel to meet required air cooling levels;

a modular design that permits some cold tube or vortex generated cold air and air amplifier production units to operate while others idle or these may be placed in a no operative state to throttle cooling on and off for regulation and conservation of pneumatic air supply;

sensors and processors to determine cooling air load necessary to lower and sustain a predetermined set temperature level internal of the transformer tank and govern whether to engage or idle cold tube units in an transformer cooling system—executed automatically or manually;

an air flow design employing multiple chilling air injectors and warm air extractors for each transformer cooling production unit;

cold tube air injectors and warm compressed air extractors to be engaged independently of each other to perform work;

synchronization in engaging/disengaging emergency cold air tube or vortex production units within an transformer cooling system by phasing and producing maximum cooling capacity whenever emergency conditions exists, such as extreme hot outside weather conditions or under conditions a transformer may be operated in overload (high amperage loading) conditions;

a methodology that employs cooling a transformer without use of polluting energy sources, no oils, no fossil fuels, explosives materials, chemicals or other contaminating elements used near the transformers;

redundant processors with a third processor for handling all controls in case an emergency backup processor is needed to take over total emergency control of the sensors and operations of a cold tube air flow and its constituent energy production units that include all active switches valves or temperature controlling elements of the emergency circuits;

a methodology that permits one or more air production units to generate compressed filtered dry air as output source for cooling while permitting another compressed air production unit within the air compressor system to generate electricity for the operation of the compressor and other electrical cooling system components;

compressed air production units within a transformer cooling system (or in compressors operating in tandem) to share load and assume additional load if one or more compressed air production units fails and take input air from the dry extracted air cycled through the cooling system to remove heat forming a reuse link to save and reuse dry hot air spent from the cooling system; and a methodology that employs control computers on a distributed system architecture buss that permits automated control of a single transformer cooling system (and its air chilling production units) or of multiple cold dry air compressors and multiple air chilling cold tubes and air amplifiers and flow control of compressed chilled air flow (and their production units) to be controlled from shared microprocessor distributed architectures.

It should be understood that the phrase "air chilling production unit," as used above, includes any mechanical system that may be used to convert one form of energy to another (chilled air to warm or hot air and to mechanical energy, for example, air pressure to cold and hot air and mechanical to electrical). A air compressor, an air turbine and other energy recovery systems are forms of an energy production unit pursuant to the present invention.

The effects of applying chilled air technology encased completely around the transformer tank forming an inter/outer sealed wall to lower power distribution transformers high oil and internal heat buildup, which employs the improvements above, functions with no significant delay after generation of compressed air supply, can be throttled manually or automatically to establish and maintain a desired level of cooling efficiency, by which the use of chilled air is applied to cool the transformer oil flow through the radiator and outside transformer encasement container called transformer tank, cooling from the outside so as not to invade the internal electrical elements that is partially or completely encased within a insulated chamber forming around the transformer encasement with cooling chambers, and an air supply provided for cooling the transformer is then collected through a medium pressure air motor to generate mechanical or electrical power (or both in tandem), can be used to drive air powered turbine turning an electrical DC generator working in conjunction with and storage battery array with DC power sufficient potential that in turn drives the air compressor generation of new air supply being driven by the basic electrical energy supply, can serve as a local power generation source for operating the cooling transformer system located in substations, industrial transformer applications or for residential transformer applications to lower internal operating temperatures.

The effects of applying chilled air to lower the internal temperature of a power distribution transformer changes the electrical operating characteristics of the transformer by not allowing the internal temperature to rise above a predetermined point where the transformer iron core and AC power electrical transformer coil windings is allowed to build up heat due to electrical characteristics operating in a heated environment, results in a poor hysteresis characteristic due in part to the heat causing eddy current flow contributed by distortions of the iron core and pure DC resistance buildup of the transformer windings from operating in an excessive heat environment.

The iron core inside the transformer is energized magnetically as the AC power is applied to the conductors of the primary coil windings and this power causes a magnetic flux which results in a current flow that builds up in the core by the accompanying flux field and when the AC power sine wave builds to maximum and begins to fall or be reduced towards zero value, current and voltage follows the AC sine wave and the current resulting from the flux field does not track exactly, the rise and fall of the AC Power sine wave. The heated conductors of the transformer windings experiencing a rise in temperature result in a large increase in resistance, and, in addition, the resulting current existing as residual current results from the current flow of the iron core collapsing field build up and this core current flow results in heat buildup within the core and this loss produces high internal oil and tank temperatures.

The effects of lowering internal temperatures through use of non-contaminating and non-penetrating cooling air inside the transformer tank and non-flammable gas elements in an highly electrical charged environment adds to safety of personnel and equipment working in and around this environment, and brings an environmentally more friendly method of achieving the best cooling method environmentally and under good margins of safety.

The effects of using non-chemicals, including water or un-named liquid methods and sources for cooling air, are employed to decrease contamination and/or undesirable flammables in vicinity or near highly charged potentials of transformers processing megawatts of electricity or electrical power will minimize risks of combustibles or fire and chemical hazards in or near vicinity of electrical transformers are eliminated.

The additional cooling effects of encasing the entire transformer in a cover shell insulated from outside elements protected within barrier walls that buries the transformer beneath earth level, and further with protection of a non-metallic and non-conducting cover over top of the transformer protects the entire closure from undesirable outside environmental conditions year round and provides cooling air passage inside the tank shell encompassing the entire transformer walls for cooling the internal tank oil or air circulating around the electrical components of the transformer.

The cooling of the below surfaces around the lowered transformer below earth level using methods of cool air flow through the cold tubes or cooling channels and air amplifier combination to acquire equal air spread to all surfaces of the transformer iron tank walls using the same chilled air flow methods.

The drying and cooling of air by applications of cycling refrigerated dryers to produce sources of dry cool air used below earth surfaces developed same as applied to claims defining methods for cooling transformer above the earth surface and with the application of cycling refrigerated dryers that supply dry cool air down to vicinity of 32 F degrees or near zero degrees Fahrenheit having very low water content and used to chill the transformer encasement through programmed cold tubes that produce even lower temperatures below −50 degrees and use of filtering air to remove moisture and bring down the humidifier conditioned air to virtually no moisture droplets occurring.

The drying and cooling of air used to cool transformers to a level producing a very low value of moisture content and storing this air below ground in stainless steel tanks that maintain this cold air to a level not affected by sunlight or outside ambient high temperatures and monitored and controlled under microprocessor control to maintain constant low level temperature and low humidity internal of each storage tank.

The production and storage of dry cooling air used to cool transformers to a level producing a very low temperature loss by installing air storage tanks of various sizes, small—medium—large and jumbo size air storage beneath ground level to eliminate the tank heat buildup from external outside environmental conditions and application of electronic monitoring and control of environmental conditions of the stored air supply and control management that recycles the air back through the cycling air dryer if humidity levels rise above a predetermined level, conditionally to maintain a predetermined state of cold dry air.

With reference now to the Drawings, there are illustrated therein a number of embodiments of the present invention.

With reference to FIGS. 1-3, there are shown prior art transformer configurations, the disadvantages of which have been described hereinabove. As illustrated in FIG. 1, a transformer system, generally designated by the reference numeral 100, includes a housing 105 within which oil is kept, resting on supports 104, and on a base 102 on the ground or earth 101. Several braces 106 provide support for the housing 105. A high-voltage input terminal 107 and a lower-voltage output terminal 108 are also shown, providing the step-down voltages discussed hereinabove. An external, oil-cooling radiator assembly, generally designated by the reference numeral 110, is attached as a permanent fixture to the housing 105.

As illustrated, the external cooling structure 110 on a side of the transformer tank or housing 105 has piping with an access near the transformer top and bottom, the configuration has an internal to external circulatory flow of oil from within the transformer tank 105, and a series of tubes constructed in an array pattern, as illustrated, that allows air flow to circulate between the series of tubes within the structure of the radiator assembly 110 for cooling the oil flowing therethrough.

With further reference to FIG. 1, the radiator assembly 110 is arranged with top and bottom circulatory pipe access, causing oil flow from inside the transformer tank 105, whereby oil having higher temperatures will rise to the top of the transformer and cooler oil circulates to the bottom. The transformer tank temperature differential is dependent upon the outside irregular weather conditions to lower oil temperatures, as well as the overall environment of the internal transformer components. Oil existing within the external radiator assembly 110 is cooled by outside ambient air flow, which is dependent upon the absolute outside ambient temperature that fluctuates, and the use of electric fans 115 under thermostat control, which helps circulate greater air flow around and through the open radiator tubes, whereby forced air blown by the series of electrically driven fans 115 force outside airflow around the array of fins. Some transformer manufacturers actually increase the overall electrical specifications and handling upwards due to the added cooling value and added air circulations flow.

With reference now to FIG. 2 of the Drawings, there is illustrated therein the transformer system 100 of FIG. 1 along an end view. As illustrated in FIG. 2, a transformer system, generally designated by the reference numeral 200, includes a housing 205 on supports 204 and on a base 202 resting on the ground 201. The system 200 includes an output terminal 208 and oil, designated generally by the reference numeral 209, within the housing, and a radiator 210 with fans 215 to cool the oil. As shown in this side view, the cooling radiator 210 operates with AC-powered motorized fans 215, preferably thermostatically controlled to operate when internal temperatures of the oil 209 rise above a preset level and the multiple grid conventional cooling fins allow outside air contact at existing ambient temperatures regardless of the prevailing temperature during the times that the transformer 200 would require cooling.

Although there are multiple cooling radiator 210 sections arranged to receive air flow, this air flow on a typical, hot summer day may not necessarily be a good source of cooling air to act as a heat exchanger. It should be understood that additional radiator sections and electric fans 215 can be added, but the problem of outside variability of the air remains. In particular, the source of cooling air used for the exchange of heat in these prior art systems is not pre-cooled or reduced in temperature. Cooling of additional radiator coils would, of course, occur under the control of an overall controlling thermostat for cooling the transformer, which is addressed by the present invention.

Transformer temperatures vary over a wide range depending upon the electrical load or megawatts being distributed through the windings and the quality of the iron core materials. All transformers will generate and radiate heat, and temperatures will increase with greater loads, increasing upwards of 50 F to as high as 80 F degrees above the nominal temperature levels, and any heat temperature radiated from a transformer is loss.

The temperatures in a transformer can be demonstrated in layers, with coolest near the bottom since heat rises, the oil carries the heat away from the electrical transformer windings or coils and the next higher layer is warm compared to hot at the transformer top as illustrated in FIG. 2 hereinabove. As much as 35% lower efficiency can be experienced when operating a transformer upwards of its temperature limits. Operators monitor the internal oil temperatures, and take drastic action at times to reduce the loads on transformers or cool the entire transformer, e.g., by spraying water on the outside transformer structure to reduce the internal heat buildup or packing ice around the overheated components.

With reference now to FIG. 3 of the Drawings, there is shown a transformer system 300, with a housing 305 on supports 304 on a base 302 on the earth 301. The system also includes a radiator assembly 310 with a number of fans 315, as in FIGS. 1 and 2, and an output terminal 308. This figure, however, better illustrates the gradations of oil temperature within the housing 305 during operation of the transformer system 300.

As mentioned, the hottest oil, a layer generally designated by the reference numeral 309A, exits the housing 305 and enters the radiator assembly 310 with its fins and is cooled by the fans 315, and re-enters the housing at the coolest level therein, a layer generally indicated by the reference identifier 309D. As the cooled oil heats up, it enters a warm layer 309C, a hot layer 309B and then re-enters the very hot layer 309A for cooling, as described.

Figure 4:
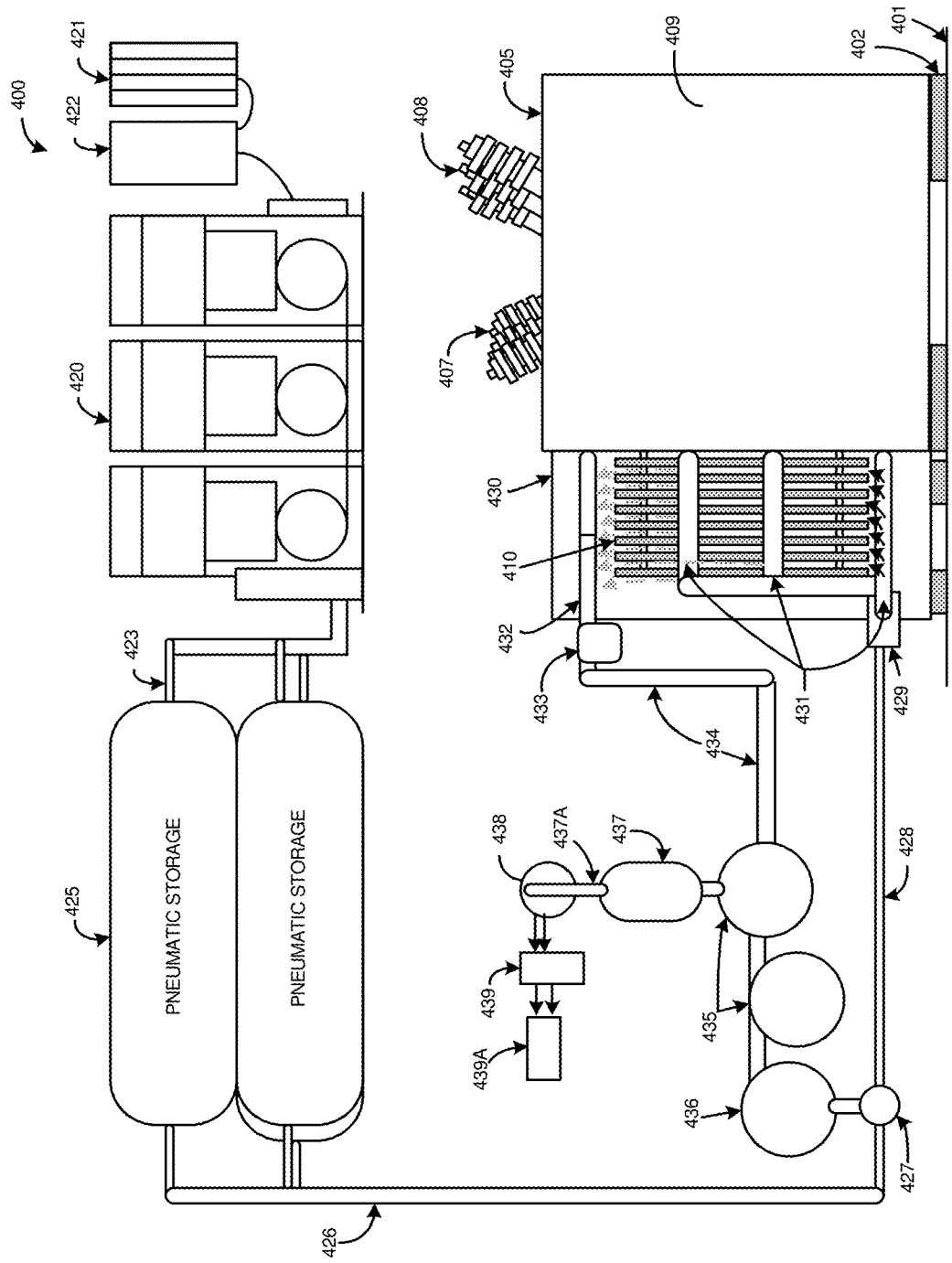
FIG. 4 is a plan and cross-sectional view of a pneumatic air cooling transformer system of the present invention.

With reference now to FIG. 4, there is shown a side view of a first embodiment of the present invention. The transformer cooling system, generally designated by the reference numeral 400, includes the aforementioned components of the prior art apparatuses, i.e., a housing 405 on a base 402 resting on the ground 401. The housing 405 is filled with oil 409, and a radiator assembly 410 protrudes from a side of the housing 405.

The present invention includes a number of air compressor cabinets or generators 420 that takes ambient air and converts it into cool, e.g., down to 34 degrees Fahrenheit, and dry air at high pressure, e.g., 120 psi. In an effort to be environmentally clean and to not divert power from the electrical feed, the compressors 420 can be powered by solar cells 421 through a solar converter 422.

Alternatively, the power source can be wind generated. The high pressure, cool and dry air is transported, via a passage 423, for storage in a number of pneumatic storage tanks 425. When needed, the stored, compressed air can be transported, via passage 426, to a flow controller 427, that regulates the pressure and reduces the pressure down to 20 psi or thereabouts. The cooled, dry air then flows, via a passage 428, to an air collection chamber 429, which is part of a cooling chamber encasement 430. The encasement 430 covers the entire radiator assembly 410, creating a controlled environment thereabout.

The compressed, cooled and dry air in the collection chamber 429 is then diverted through various control channels, generally designated by the reference numeral 431, to various parts of the radiator assembly 410. It should be understood that the amount of air through each of the various control channels 431 can be governed or controlled to provide automatic and dynamic temperature control over the cooling of the radiator assembly and the oil or other liquid therein. As the injected air warms, it is collected at a spent hot air collector 432 along the top of the encasement 430 and passed on to an air amplifier 433.

The spent air is then forwarded, via a compressed spent air feed passage 434, to a mixer stage spent air source, generally designated by the reference numeral 435. Some of the spent air is sent to a spent air recovery stage 436 and returned to the initial feed through the flow controller 427. Other spent air is funneled to an air amplifier 437 and, via a spent compressed air port 437A, powers an air turbine-driven DC power alternator 438, and a power supply control 439, which, in turn, charges a storage battery 439A, thereby conserving excess air pressure energy.

Figure 5:
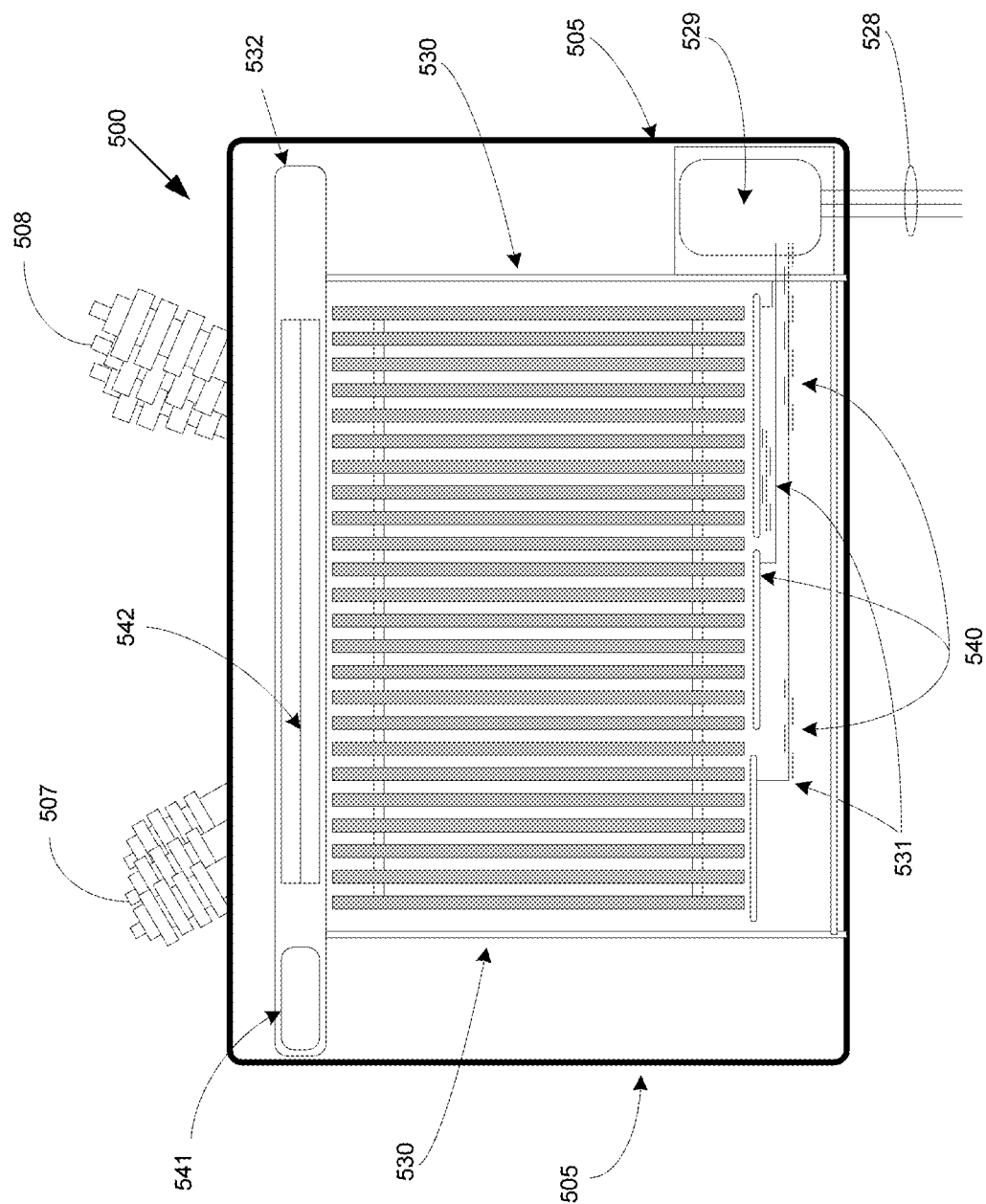
FIG. 5 is a front, cross-sectional elevational view of an aspect of the pneumatic air cooling transformer system shown in FIG. 4.

With reference now to FIG. 5 of the Drawings, there is illustrated therein a cross-sectional frontal view of a transformer cooling system, generally designated by the reference numeral 500, corresponding to the embodiment shown in FIG. 4. As shown in FIG. 5, a cooling chamber encasement 530 is affixed to a side of the transformer housing 505. A high-voltage input terminal 507 and a lower-voltage output terminal 508 are also shown.

The aforementioned cooled, dry and compressed air, e.g., at 20 psi, is passed through passage 528, injected into an air collection chamber 529, and distributed within the encasement 530, via various cool air feeder lines or control channels, generally designated by the reference numeral 531, particularly directed to the various fins of a radiator assembly 510. Also shown are a plurality of cooling channels or air curtains, generally designated by the reference numeral 540, that provide additional control over the cooled air distribution.

The cooled air, distributed across the fins of the radiator assembly 510, thereby cools the hot oil (or other liquid) within the oil tank heated from the transformer windings and other components, as discussed. As opposed to the configuration of the prior art, as illustrated in FIGS. 1-3 and described hereinabove, the cooling chamber encasement 530 creates a controlled environment around the radiator assembly 510. Internal fans may be employed if necessary to further distribute the cooled air, although in a preferred embodiment of the present invention, the cooling control channels adequately handle the cool air distribution, thereby eliminating moving parts within the system 500.

As also shown in FIG. 5, the transformer cooling system 500 includes a spent hot air collector 532 to gather the heated air. Also shown is a hot air exhaust port 541, and an emergency heat release door 542.

Figure 6:
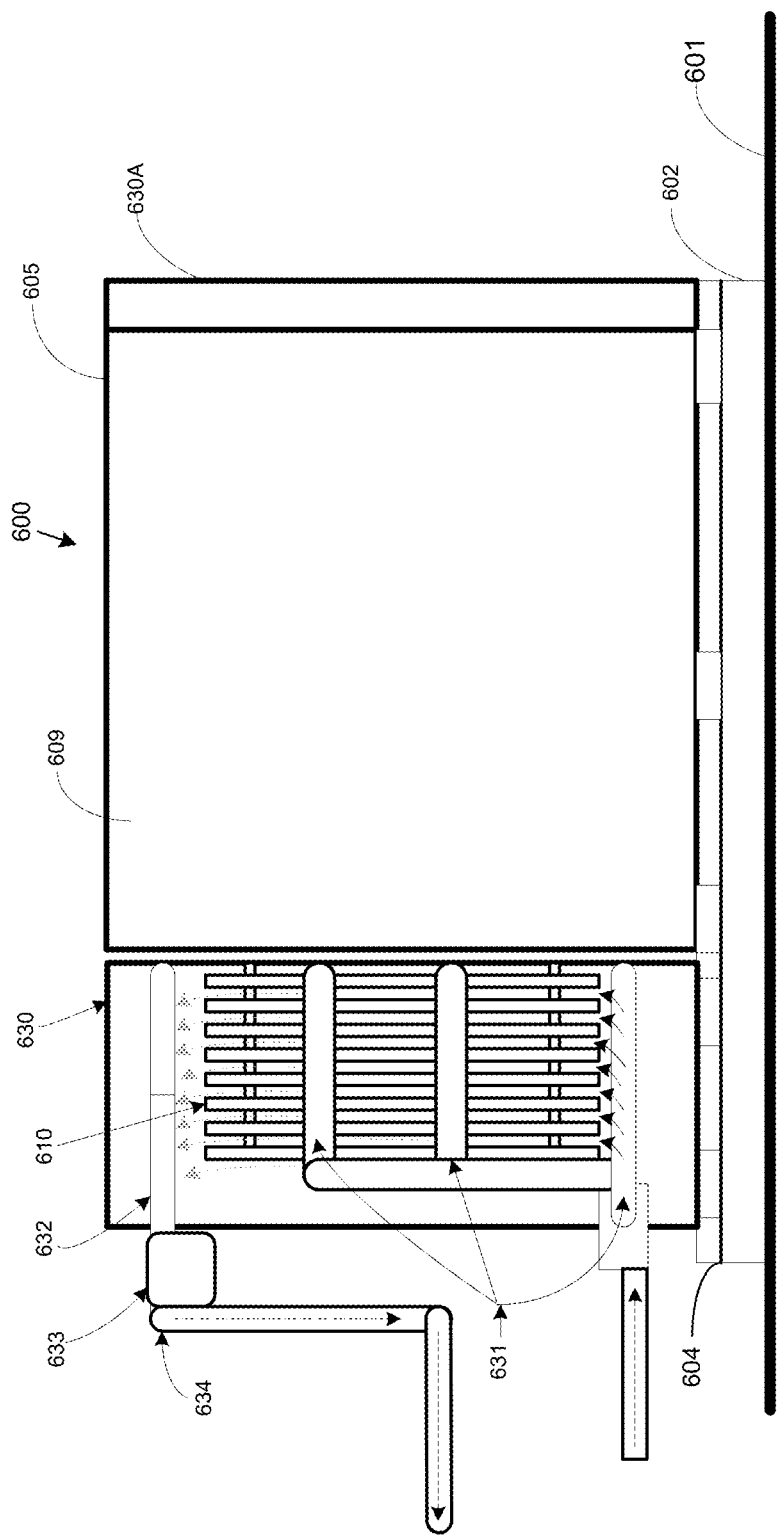
FIG. 6 is a side, cross-sectional elevational view of an alternate embodiment of the pneumatic air cooling transformer system of the present invention, illustrating a surrounding cooling chamber.

With reference now to FIG. 6, there is illustrated an alternate embodiment of the present invention, designated generally by the reference numeral 600. As shown, a transformer housing 605 rests on supports 604 and on an enlarged base portion 602 on the ground 601. In this embodiment, the cooling chamber encasement surrounds the entire transformer portion, i.e., around the housing 605, forming a cooling air chamber around the transformer, generally designated by the reference numeral 606, to collect the heat energy dissipated along the sides of the housing 605. A cooling air wall 630A is shown. It should be understood that the expanded chamber 630 can completely surround all six sides of the housing 605, i.e., the four sides and the top and bottom, by a cushion of air, the sides and the top, or any other combination. As discussed, the heat energy emanating from the operational transformer apparatus can be collected and used, e.g., to charge a battery, as described hereinabove.

Figure 7:
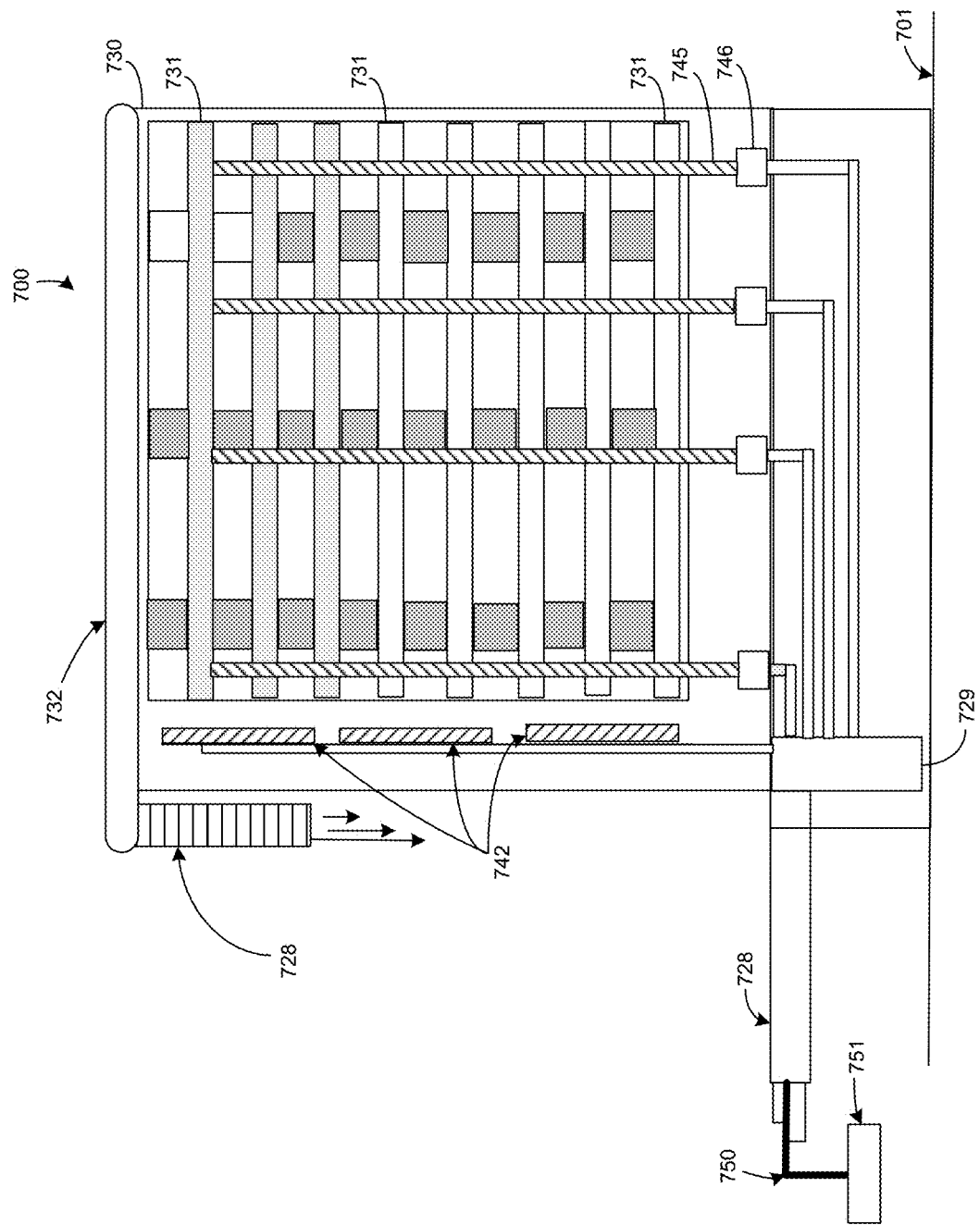
FIG. 7 is a side, cross-sectional elevational view of an aspect of the pneumatic air cooling transformer system as shown in FIGS. 4 and 6.

With reference now to FIG. 7 of the Drawings, there is illustrated a more detailed depiction of a preferred mechanism for controlling the cooling air, generally designated by the reference numeral 700. As shown, a cooling chamber encasement 730 receives the aforementioned cool, dry and compressed air via a cool air duct 728 which flows into an air collection chamber 729. The cool air then passes through a number of vertical passages or channels 745, generally depicted in FIGS. 4 and 6, and then horizontally along a number of control channels 731.

The air flow and pressure along each vertical passage 745 is governed by respective controllers 746, each connected to an Ethernet or other signal control buss 750. In this manner, the operations and temperature of the transformer system 700 can be dynamically, automatically and/or remotely controlled to improve efficiency and/or override default settings for particular purposes, e.g., operating at or above peak settings.

Spent air is collected along the top via a spent hot air collector 732 and the heated air channeled for further processing via a spent air feed passage 734. Also shown are emergency air release doors 742.

Also shown in FIG. 7 is a controller 751 through which a user or operator can control the various operations of the transformer cooling system and its component parts, either automatically, such as by computer, PC or processor commands, or manually. It should be understood that the controller 751 (or like device), Internet or other wireline or wireless, can be employed in the other depicted embodiments as well to regulate air quantity, temperature, air dryness, system load, spent air recovery and recycling, conversion of spent air to battery storage, generation of compressed air by the compressors for storage in the tanks, control of photovoltaic or solar cells and wind sources to power the various components, such as the compressors, control the interplay of the stored energy (batteries, pneumatic tanks) with outside power sources (diesel and steam generators), control individual or all parts of a modular assembly so that some are on and some off, and otherwise govern any or all of the operations of the cooling technique of the system and methodology of the present invention.

Figure 8:
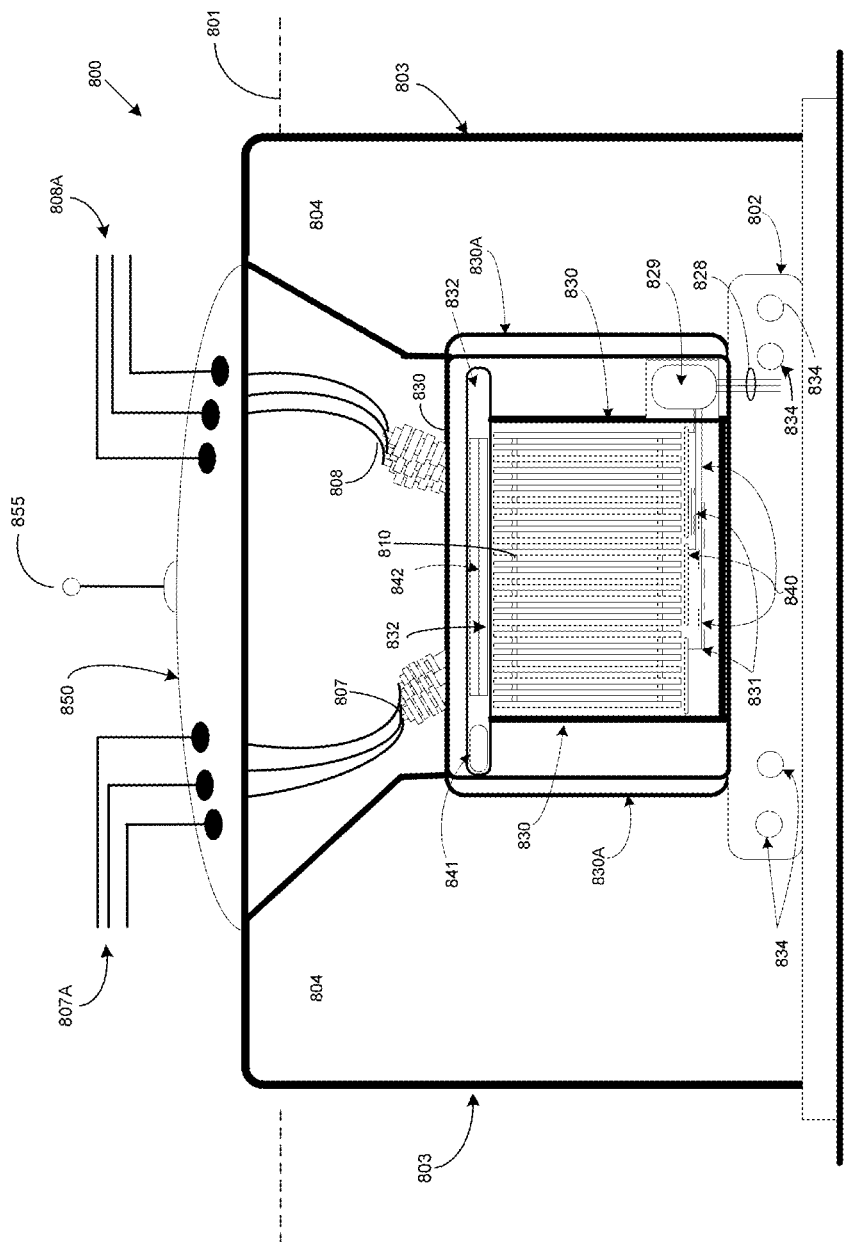
FIG. 8 is a side, cross-sectional elevational view of an alternate embodiment of the pneumatic air cooling transformer system of the present invention, illustrating the implementation below ground.

It should be understood that the embodiments of the present invention may be employed at small or large scales. Although the embodiments thus far illustrated are depicted above ground, the present invention is also deployable in below-ground implementations, such as illustrated in FIG. 8. It should be understood that a "clean room" type environment below ground can be employed to take advantage of the earth's thermal cooling properties, better shield the entire apparatus from the elements, better control the interior environment, and better protect the components from accidental contact with operators or the public. Preferably, a concrete bunker or hole, generally designated by the reference numeral 803, can be fashioned to house the entire transformer system, generally designated by the reference numeral 800, providing support and insulation.

With further reference now to FIG. 8 of the Drawings, there is illustrated a below-ground embodiment of the transformer cooling system of the instant invention, generally designated by the reference numeral 800. As shown, the system is below the ground level 801 in a concrete or other reinforced encasement 803 surrounded by earth. The cavity or hole formed is designated by the reference numeral 804. The transformer apparatus rests upon a base 802 and is within a cooling chamber encasement, the walls of which are designated by the reference numerals 830 (covering a radiator assembly 810) and 830A (covering the transformer housing sides, as described in connection with FIG. 7). A high-voltage input terminal 807, with an AC primary power feeder 807A, and a lower-voltage output terminal 808, with an AC secondary power distributor 808A, are also shown.

The cooled, dry and compressed air inputs feeder lines 831 and are controlled via cooling channels 840, as described. The spent, hot air is collected, along a spent hot air collector 832, and output via a hot air exhaust port 841 and sent, via heated air purge ducts 834, for further processing and energy recovery, as discussed hereinabove. Also shown are emergency air release doors 842. Covering and sealing off the cavity 804 from the ambient environment is a cover 850, preferably made of a non-conductive material, and including a discharge 855 to eliminate unwanted static potentials.

It should be understood in an alternate embodiment that the floor and walls of the bunker or subterranean cavity, and the cap 850, for the transformer system may constitute the cooling chamber. The "cooling" elements are accordingly configured to distribute the cool air across the fins of the radiators and across the surface of the transformer housing to dissipate heat emanating therefrom. The heated air is then removed, as per the embodiments discussed herein.

Figure 9:
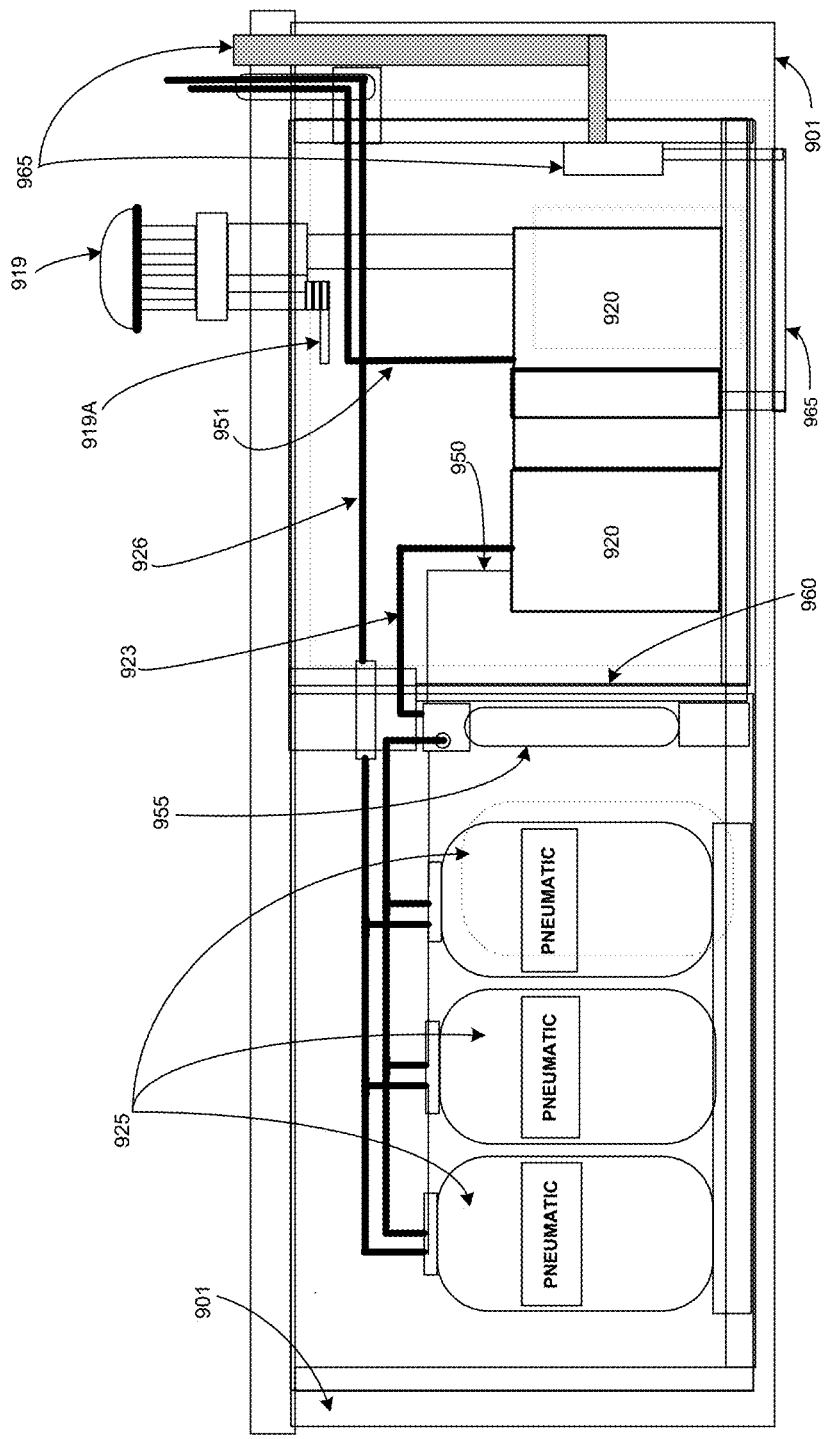
FIG. 9 is a side, cross-sectional elevational view of an alternate embodiment of the pneumatic air cooling transformer system of the present invention, illustrating a portion of the components below ground.

It should also be understood that parts of the aforementioned transformer cooling system may be below ground while others are above. For example, FIG. 9 illustrates a portion of the configuration shown in FIG. 4, particularly the air compressor system and pneumatic tanks, beneath the ground in a subterranean enclosure, exposed only at the top. As depicted in FIG. 9, within a cavity 904 are a number of air compressor cabinets or generators 920 that takes ambient air, via an air inlet 919 with a vent 919A, and converts it into cool, e.g., down to 34 degrees Fahrenheit, and dry air at high pressure, e.g., 120 psi, as discussed hereinabove. The compressed air is then piped, via a compressor output line 923, to a number of pneumatic air storage tanks 925. The air along the way is passed through an air filter 955. The stored cool and dry air is then piped to the other components via a passage 926. Also shown are control busses 950 and 951, providing the mechanism for remote control of the various operations within the transformer cooling system embodiments described herein, particularly here to govern the operations of the compressors 920, a sliding door 960 separating the compressors 920 and the tanks 925, and a power source 965 for the compressors 920.

The previous descriptions are of preferred embodiments for implementing the invention, and the scope of the invention should not necessarily be limited by these descriptions. It should be understood that all articles, references and citations recited herein are expressly incorporated by reference in their entirety. The scope of the current invention is defined by the following claims.

What is claimed is:

1. A subterranean transformer cooling system comprising:
   a transformer in a transformer housing, said transformer housing containing a coolant therein for cooling said transformer, said transformer housing rests within a subterranean chamber and upon a subterranean surface within said subterranean chamber,
   wherein said subterranean chamber comprises a plurality of subterranean walls;
   a cover enclosing said subterranean chamber apart from the ambient environment;
   at least one radiator externally connected to said transformer housing and within said subterranean chamber, said at least one radiator receiving heated coolant from said transformer housing and returning cooled coolant to said transformer housing;
   an air collection chamber; connecting to an input port to said at least one radiator, whereby a cooled gas is input through said air collection chamber and directed into said at least one radiator, said cooled gas then circulating along internal surfaces of said at least one radiator and exchanging energy with said coolant;
   an output port of said at least one radiator, whereby hot gas from said at least one radiator exits and is directed to a spent energy recovery mechanism, and
   at least one regulator, said at least one regulator regulating said input port.

2. The subterranean transformer cooling system according to claim 1 wherein said at least one regulator regulates said input port.

3. The subterranean transformer cooling system according to claim 1, wherein said coolant is oil.

4. The subterranean transformer cooling system according to claim 1, wherein the walls of said subterranean chamber and the subterranean surface are made of concrete.

5. The subterranean transformer cooling system according to claim 1, further comprising:
at least one compressor, said at least one compressor connected to said input port, and cooling and drying ambient air, forming said cooled gas.

6. The subterranean transformer cooling system according to claim 5, further comprising:
at least one alternate energy source powering said at least one compressor, said alternate energy source employing power supplied from a source selected from the group consisting of thermal, solar, wind and recycled energy.

7. The subterranean transformer cooling system according to claim 6, wherein at least one of said at least one compressor and said at least one alternate energy source is subterranean.

8. The subterranean transformer cooling system according to claim 6, wherein at least one of said at least one compressor and said at least one alternate energy source rests upon a ground surface.

9. The subterranean transformer cooling system according to claim 1, further comprising:
at least one pneumatic storage tank storing compressed cooled gas from at least one compressor; and
a flow controller connected to said at least one pneumatic storage tank and controlling the flow of said cooled gas to said input port.

10. The subterranean transformer cooling system according to claim 9, wherein said at least one pneumatic storage tank is subterranean.

11. The subterranean transformer cooling system according to claim 9, wherein said at least one pneumatic storage tank rests upon a ground surface.

12. The subterranean transformer cooling system according to claim 1, wherein said spent energy recovery mechanism comprises:
a spent air recovery mechanism connected to said output port and gathering said hot gas expelled from said output port.

13. The subterranean transformer cooling system according to claim 12, wherein said spent air recovery mechanism is connected to a flow controller, whereby said expelled hot gas, upon cooling, is returned to said input port.

14. The subterranean transformer cooling system according to claim 12, wherein said spent air recovery mechanism is connected to an alternator, said alternator powered by said expelled hot gas and charging a battery therefrom.

15. The subterranean transformer cooling system according to claim 1, further comprising:
an alternator device, said alternator device receiving said hot gas and converting the heat therefrom to battery power.

16. The subterranean transformer cooling system according to claim 1, wherein said subterranean chamber comprises a plurality of channels for routing said cooled gas from the input port along said surfaces of said at least one radiator.

17. The subterranean transformer cooling system according to claim 16, wherein said plurality of channels form a cooling matrix.

18. The subterranean transformer cooling system according to claim 1, wherein said at least one regulator regulates said output port.

19. The subterranean transformer cooling system according to claim 1, wherein said at least one regulator regulates said cooled gas circulation in said subterranean chamber.

20. The subterranean transformer cooling system according to claim 1, wherein said at least one regulator is connected to a remote control, whereby said at least one regulator is controlled remotely.

21. The subterranean transformer cooling system according to claim 20, wherein said remote control comprises a connector selected from the group consisting of the Internet, wireline and wireless.

22. The subterranean transformer cooling system according to claim 1, further comprising:
an energy converter, said energy converter recovering heat from said transformer and forwarding said heat outside said subterranean chamber.

23. The subterranean transformer cooling system according to claim 1, further comprising:
at least one sensor, said at least one sensor gathering data, said data selected from the group consisting of air quantity, air temperature, air dryness, system load, spent air recovery, recycling, conversion of spent air to battery, compressed air storage amount and pressure, photovoltaic, solar cell, wind, diesel generators, steam generators, and other outside devices, and combinations thereof.

* * * * *